United States Patent [19]

Sandaiji et al.

[11] Patent Number: 4,948,460
[45] Date of Patent: Aug. 14, 1990

[54] METHOD OF PRODUCING HEAD CORE SLIDER FOR RIGID MAGNETIC DISK DRIVE, UTILIZING LASER-INDUCED ETCHING

[75] Inventors: Hideto Sandaiji, Kasugai; Fuminori Takeya, Nagoya; Nobuhiro Terada, Kasugai, all of Japan

[73] Assignee: NGK Insulators, Ltd., Japan

[21] Appl. No.: 409,946

[22] Filed: Sep. 20, 1989

[30] Foreign Application Priority Data

Sep. 24, 1988 [JP] Japan .................. 63-239244

[51] Int. Cl.⁵ .................. B44C 1/22; C23F 1/02; C03C 15/00; C03C 25/06
[52] U.S. Cl. .................. 156/630; 29/603; 156/633; 156/645; 156/647; 156/651; 156/659.1; 156/667; 219/121.69; 219/121.85; 360/126; 360/127
[58] Field of Search .............. 156/629, 630, 633, 634, 156/645, 647, 651, 659.1, 667; 29/603, 609; 219/121.68, 121.69, 121.84, 121.85; 360/110, 125, 126, 127

[56] References Cited

U.S. PATENT DOCUMENTS 4,751,779  6/1988  Nagatomo et al. .................. 29/603

FOREIGN PATENT DOCUMENTS

| 51-29118 | 3/1976 | Japan . . |
|---|---|---|
| 51-114111 | 10/1976 | Japan . |
| 53-61319 | 6/1978 | Japan . |
| 55-117726 | 9/1980 | Japan . |
| 57-212617 | 12/1982 | Japan . |
| 61-260408 | 11/1986 | Japan . |
| 62-18615 | 1/1987 | Japan . |
| 62-83483 | 4/1987 | Japan . |
| 62-234214 | 10/1987 | Japan . |
| 64-15380 | 1/1989 | Japan . |

OTHER PUBLICATIONS

Nakanishi et al., "Narrow Track Magnetic Head Fabricated by Means of Ion Etching Method", (Musashino Electrical Communication Laboratory, N.T.T.) MR77-1, pp. 1-10 (1977).

J. E. Hitchner et al., "Fabrication of Ferrite Magnetic Head", IBM Technical Bulletin, vol. 24, No. 2, p. 995, Jul. 1981.

Primary Examiner—William A. Powell
Attorney, Agent, or Firm—Arnold, White & Durkee

[57] ABSTRACT

A method of producing a magnetic head core slider including integrally formed slider body and yoke portion. The slider body has two parallel air bearing portions, while the yoke portion has a track portion. The slider body and yoke portion cooperatively provide a magnetic gap open in the track portion. The core slider is prepared from an integral ferrite bar consisting of a first and a second ferrite block which give the slider body and the yoke portion, respectively. Track-defining grooves are formed by laser-induced etching in one surface of the bar, such that the grooves extend across the interface of the bonded two blocks. The grooves define the width of the track portion. An etching mask is applied to cover portions of the bar corresponding to the air bearing portions and the track portion. The masked surface of the bar is chemically etched to form the air bearing portions, and a track protrusion including the track portion, such that the air bearing portion and the track protrusion have the same height.

16 Claims, 8 Drawing Sheets

METHOD OF PRODUCING HEAD CORE SLIDER FOR RIGID MAGNETIC DISK DRIVE, UTILIZING LASER-INDUCED ETCHING

BACKGROUND OF THE INVENTION

1. Field of the Invention

The present invention relates to a method of producing a head core slider for a rigid magnetic disk drive, and more particularly to a method of producing such a head core slider, which makes it possible to form a track with a sufficiently small and accurately controlled width, and which consists of a significantly reduced number of process steps.

2. Discussion of the Prior Art

Figure 1:
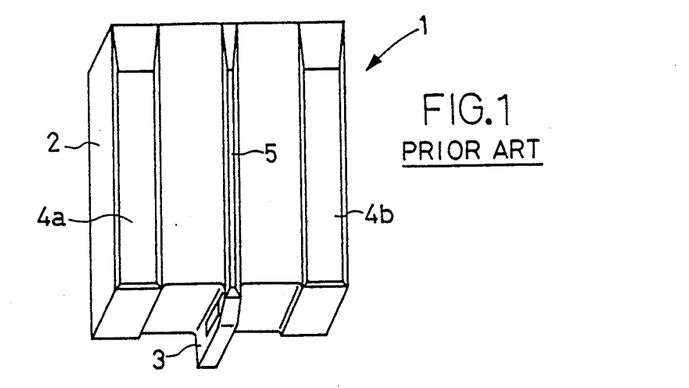
FIG. 1 is a perspective view of an example of a conventional monolithic type head core slider for a rigid magnetic disk drive.

In the art of a rigid magnetic disk drive (sometimes abbreviated as "RDD"), there is known a floating-type magnetic head which employs a bulk type core slider, such as a monolithic type slider as shown generally at 1 in FIG. 1. This core slider 1 is an integral structure consisting of a slider body 2, and a yoke portion 3 which is generally C-shaped in cross section. On one surface of the slider body 2 on which a recording medium in the form of a magnetic disk slidably rotates, there are formed a pair of parallel spaced-apart air bearing portions 4a, 4b which extend in the rotating or sliding direction of the magnetic disk. The sliding surfaces of the air bearing portions 4a, 4b have a suitable height as measured from a recessed portion therebetween. The core slider 1 has a center rail 5 which is formed between the air bearing portions 4a, 4b, so as to extend parallel to the air bearing portions. The center rail 5 serves as an elongate track portion whose surface has the same height as the air bearing portions 4a, 4b. In operation, a selected recording track of the magnetic disk is aligned with the track portion or center rail 5. The yoke portion 3 indicated above is formed integrally with the slider body 2, at one of opposite ends of the center rail 5. The yoke portion 3 and the slider body 2 cooperate with each other to define a closed magnetic path for the magnetic head.

The monolithic type core slider 1 formed solely of a ferrite material is comparatively economical to manufacture. The width of the elongate track portion is determined by tapering or chamfering the parallel edges of the center rail 5. This manner of forming the track portion suffers from difficulties in precisely establishing the desired track width, and in reducing the track width. For meeting the recently growing need of increased density of information per unit area of a recording medium, the required width of the track is less than 20 $\mu$m with a permissible error being held to within $\pm 2$ $\mu$m. Further, when the core slider 1 is moved off the surface of the magnetic disk, both of the air bearing portions 4a, 4b should lie within the range of radius of the magnetic disk. Namely, the center rail or track portion 5 located between the two air bearing portions 4a, 4b should be positioned a given distance away from the outer periphery of the magnetic disk in the radially inward direction. Therefore, the effective recording surface area of the magnetic disk is reduced to an extent corresponding to the distance between the track portion 5 and the air bearing portion 4a, 4b. In other words, the data storage capacity of the magnetic disk is limited by the construction of the core slider 1.

There is also known a composite type core slider consisting of a slider body and a head core which are separately prepared. More specifically, a ferrite core having a track portion formed perpendicularly to its surface is partially embedded in and fixed to a non-magnetic slider body. This composite type core slider is advantageous over the monolithic type, in that the track portion can be formed with its width accurately controlled to a desired value, and that the width can be made relatively small. The composite type is further advantageous in that the track portion can be formed in alignment with an air bearing portion, i.e., formed on a line of extension of the air bearing portion, whereby the outer peripheral portion of the magnetic disk can be used as an effective recording area. However, the composite type core slider is disadvantageous in the cost of manufacture, because of the steps of separately preparing the slider body and the core, and then joining these two members together.

A further type of core slider is proposed according to laid-open Publication No. 62-18615 of unexamined Japanese patent application, in an attempt to lower the cost of manufacture while enjoying the functional advantages of the composite type discussed above. In this proposed core slider, a yoke portion is formed integrally with a slider body, at one end of an air bearing portion formed on the slider body, such that the yoke portion and the slider body cooperate to constitute a head core which has a magnetic gap. To produce this core slider, grooves defining a track portion are formed in appropriate two blocks, and the two blocks with the grooves filled with a glass material are butted together and bonded by the glass material, such that selected parts of the joining surfaces define the magnetic gap therebetween. Subsequently, the obtained body of the bonded blocks is subjected to a grooving operation to form the air bearing portion and the yoke portion.

As compared with the monolithic type core slider, the structure proposed in the above-identified publication is easier to manufacture, because the track portion is aligned with the extension line of the air bearing portion, so that both the track portion and the air bearing portion can be formed simultaneously by a grooving operation. Where only one of the two ferrite blocks is subjected to a grooving operation to form the track, the positioning of the two ferrite blocks for alignment of the track grooves is unnecessary. In this case, however, the fringing effect at the edge of the magnetic gap is too large to permit an effective high-density recording operation on the storage medium. Where both of the ferrite blocks are grooved to form the track, it is necessary to establish cumbersome and difficult alignment of the grooves of the two blocks. Furthermore, the cross sectional area of the yoke portion tends to be large, as compared with the aforementioned composite type or monolithic type core slider. In this case, therefore, the inductance of the yoke portion is undesirably high, making it difficult to effect a high-frequency recording, i.e., difficult to achieve a high density of information recorded per unit area of the recording medium.

For producing the above-mentioned conventional core sliders, the grooving operation to form the pair of parallel spaced-apart air bearing portions and the center rail or track portion, and the chamfering of the formed air bearing and track portions are conducted by a machining operation using a grinding stone such as a diamond wheel. The grooving and chamfering operations require a total of eight grinding passes for each core slider, and are the most time-consuming steps of the process. Furthermore, the error in the widths of the air bearing portions and track portion (center rail) cannot be kept to within a permissible range of ±3 microns, due to unavoidable positioning error of the grinding wheel, and due to inevitable variations in the thickness or height of the blank for the slider body and positioning error of the yoke portion bonded to the slider body blank. Further, the surfaces finished by the diamond wheel inevitably suffers from chipping of one micron or more.

SUMMARY OF THE INVENTION

It is therefore an object of the present invention to provide an improved method of producing a magnetic head core slider for a rigid magnetic disk drive, which permits the track portion of the slider to be formed with a sufficiently reduced and accurately controlled width, allowing a high-density recording operation, without a cross talk due to the reading of information from the adjacent tracks of the recording medium neighboring the relevant track.

Another object of the present invention is to provide a method of producing a magnetic head core slider without chipping at the edges of the track portion.

A further object of the invention is to provide a method of producing a magnetic head core slider, with a reduced number of process steps, and at an accordingly reduced cost of manufacture.

The above objects may be achieved according to the principle of the present invention, which provides a method of producing a head core slider for a rigid magnetic disk drive, including a slider body and a yoke portion formed as an integral part of the slider body, the slider body having a pair of spaced-apart parallel air bearing portions having a predetermined height, while the yoke portion having a track portion for sliding contact with a magnetic recording medium, the yoke portion and the slider body cooperating to form a closed magnetic path having a predetermined magnetic gap which is open in a top surface of the track portion, the method comprising the steps of: (a) preparing a first ferrite block which gives the slider body, and a second ferrite block which gives the yoke portion; (b) butting and bonding together the first and second ferrite blocks into a ferrite bar having a sliding surface on which the air bearing portions and the track portion are to be formed; (c) forming, by laser-induced etching, at least two parallel track-defining grooves in the sliding surface of the ferrite bar, such that the at least two track-defining grooves extend across an interface between the first and second ferrite blocks, the at least two track-defining grooves defining therebetween the track portion having a predetermined width in a direction perpendicular to a direction of extension of the grooves; (d) applying a pattern of etching mask to the sliding surface of the ferrite bar, so as to cover portions of the sliding surface which correspond to the air bearing portions and the track portion; and (e) chemically etching the masked sliding surface of the ferrite bar, and thereby forming the air bearing portions, and a track protrusion which includes the track portion, such that the air bearing portion and the track protrusion have a same height.

In the present method of the invention described above for producing a core slider for a rigid magnetic disk drive, the track-defining grooves for defining the track portion are formed simultaneously in both of the first and second ferrite blocks, after these two blocks are bonded together into the ferrite bar. Thus, the present method eliminates positioning or alignment of the two ferrite blocks after the track-defining portions are formed in the two separate blocks, as required in the conventional method for producing a composite type core slider. Thus, the track portion of the core slider can be accurately formed according to the present method.

Further, the present method which utilizes laser-induced etching to form the track-defining grooves permits the track portion to be formed with a sufficiently small width, which can be accurately controlled by changing the spacing between the adjacent track-defining grooves. Further, laser-induced etching makes it possible to form the track portion such that its opposite side surfaces defining width of the track portion are almost perpendicular (about 80-90°) to the top surface. Therefore, the grinding of the sliding surface of the ferrite block to obtain a desired depth of the magnetic gap does not result in considerably changing the width of the track portion. This arrangement is also effective to minimizing the cross talk phenomenon in which the magnetic head picks up information signals from tracks of a magnetic disk adjacent to the relevant track while the magnetic head is spaced away from the disk. Accordingly, the width of the non-recording guard bands to prevent such cross talk can be reduced, whereby the magnetic disk can be effectively utilized for increased density of information stored per unit area. In addition, the core slider produced according to the present method which does not use a grinding wheel to form the track portion is free of chipping of the track portion at its edges, thereby providing increased operating reliability.

While the track portion of the track protrusion is accurately formed by laser-induced etching, the air bearing portions and the other portions of the track protrusion which require comparatively low accuracy of manufacture are efficiently formed by chemical etching. Hence, the production efficiency according to the present method remains sufficiently high.

A layer of a suitable metallic magnetic material may be applied to at least the gap-forming portion of at least one of the two ferrite blocks, before the two blocks are bonded together. In this case, the metallic magnetic layer may be formed on a previously formed intermediate glass layer, and a non-magnetic layer may be formed on the metallic magnetic layer or on the gap-forming portion of the block not covered by the metallic magnetic layer.

The laser-induced etching to form the track-defining grooves may either precedes or follows the chemical etching to form the air bearing portions and track protrusion. The laser-induced etching may be effected with the ferrite bar placed in a suitable etching atmosphere or solution.

The track-defining grooves may be filled with a portion of the etching mask, or a non-magnetic material applied before the etching mask is applied.

BRIEF DESCRIPTION OF THE DRAWINGS

The foregoing and optional objects, features and advantages of the present invention will be better understood by reading the following detailed description of presently preferred embodiments of the invention, when considered in connection with the accompanying drawings, in which:

FIG. 2-14 are views illustrating process steps of a method according to one embodiment of the present invention, wherein

FIGS. 15-18 are views illustrating respective steps of the method according to another embodiment of the invention, wherein

FIGS. 21-25 are views illustrating part of the process steps of a still further embodiment of the present invention;

DETAILED DESCRIPTION OF THE PREFERRED EMBODIMENTS

For producing magnetic head core sliders for a rigid magnetic disk drive according to the method of the present invention, first and second ferrite blocks are first prepared. The first ferrite block gives a slider body of each core slider, while the second ferrite block gives a yoke portion of the core slider. The two ferrite blocks are made of a conventionally used high permeability ferrite material, and are usually elongate rectangular blocks having suitable thicknesses, and lengths sufficient to produce two or more core sliders. The first and second ferrite blocks are butted and bonded together into an integral ferrite structure which has a closed annular magnetic path for a magnetic head. Each of the high permeability ferrite blocks may consist of a single crystal or a polycrystalline structure of Mn-Zn ferrite or Ni-Zn ferrite, or may be a composite structure consisting of a single crystalline body and a polycrystalline body. Usually, the width of air bearing portions should be controlled to within a tolerance of $\pm 15$ $\mu$m, to maintain the linearity of the edges of the etched air bearing portions, i.e., the straightness of the etched air bearing portions, within a range of $\pm 15$ $\mu$m, and to assure a symmetrical relation of the inclined side surfaces of each air bearing portion. To this end, the following combinations of the crystal plane and orientation of ferrite crystals are desirable, for the surface of the air bearing portions and the longitudinal direction of the air bearing portions: (100) and <100>; (100) and <110>; (110) and <100>; (110) and <110>; (311) and <332>; (332) and <311>; (611) and <331>; (331) and <611>; and (211) and <111>, as disclosed in laid-open Publication No. 64-15380 of unexamined Japanese patent application No. 62-171666 filed in the name of the assignee of the present application.

Figures 2A, 2B:
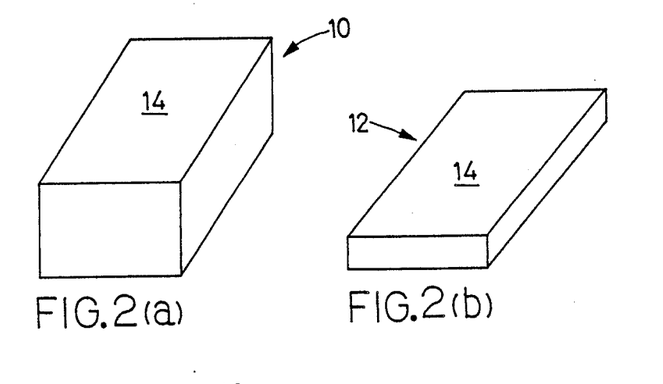
FIGS. 2(a) and 2(b) are perspective views respectively showing two ferrite blocks to be assembled together.
Figure 3A:
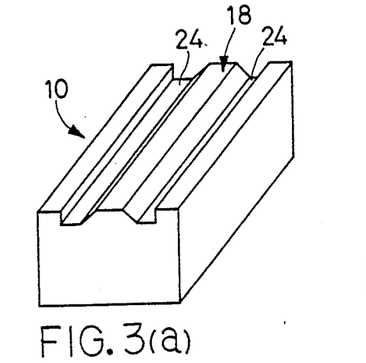
FIGS. 3(a) and 3(b) are perspective views respectively showing the two ferrite blocks in which grooves for winding coils are formed.
Figure 3B:
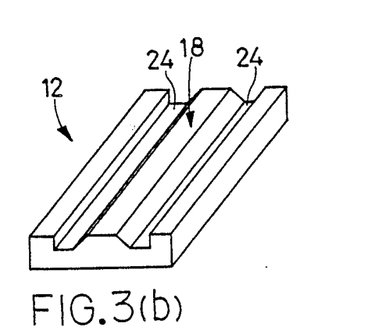

At least one of the two ferrite blocks is provided with at least one coil-winding groove formed in at least one of the abutting surfaces, so that the groove facilitate the winding of a coil for the core slider to be prepared. An example of the first and second ferrite blocks are indicated at 10 and 12 in FIGS. 2(a) and 2(b), respectively. In each of the abutting surfaces 14, 14 of these two ferrite blocks 10, 12, there are formed two coil-winding grooves 24 as shown in FIGS. 3(a) and 3(b). These grooves 24 are respectively located on both sides of a gap-forming portion 18 of the ferrite blocks 10, 12. The first and second blocks 10, 12 are bonded together to form an integral ferrite structure 26 shown in FIG. 4, which gives two ferrite bars 32, 32 shown in FIG. 5, as described below. Thereafter, the abutting surfaces 14, 14 of the ferrite blocks 10, 12 which are to be butted together are polished or otherwise finished, as needed.

Then, the two blocks 10, 12 thus finished are butted at the abutting surfaces 14, 14 such that the gap-forming portions 18, 18 are aligned with each other so that an annular magnetic path is formed. Subsequently, glass rods (28) are inserted in the coil-winding grooves 24, and in rear grooves if formed in the portions of the block or blocks 10, 12 remote from the gap-forming portions 18. The ferrite blocks 10, 12 are heated while being pressed against each other, so that the two ferrite blocks 10, 12 are bonded together with a molten glass 28 of the glass rod which partially fills the coil-winding grooves 24. For example, the glass rod is formed of a glass having a softening point of 360° C. and heated to 500° C. to join the first and second blocks 10, 12. Instead of joining together the ferrite blocks 10, 12 by such a glass material, the blocks 10, 12 may be bonded together at the abutting surfaces (14) by sintering utilizing a well known direct solid-solid reaction bonding technique.

Figures 4, 5, 6:
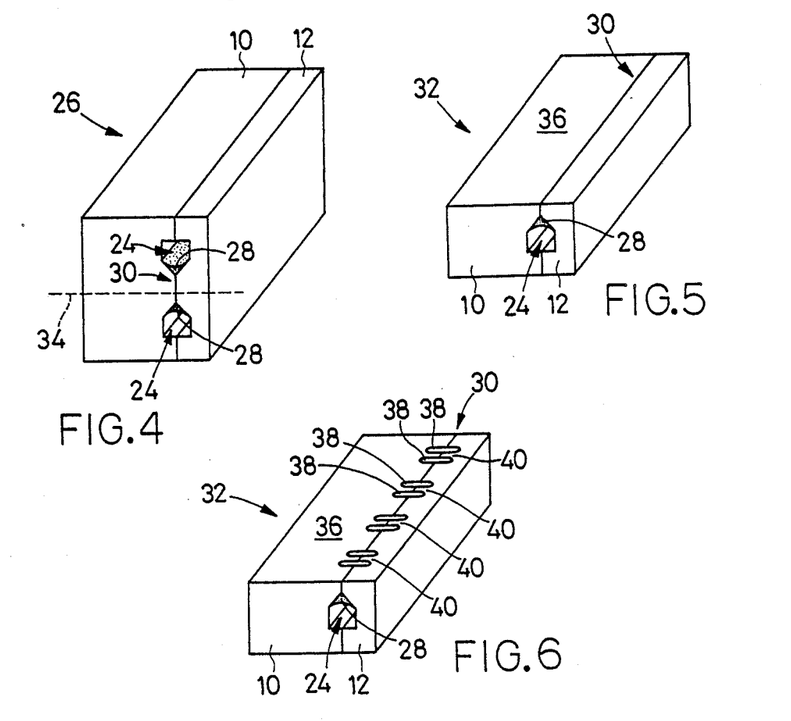
FIG. 4 is a perspective view showing the two ferrite blocks joined together into an integral ferrite structure.
FIG. 5 is a perspective view of a ferrite bar obtained by cutting the integral ferrite structure of FIG. 4.
FIG. 6 is a perspective view showing the ferrite bar on which track-defining grooves for defining the width of track portions are formed.

Referring to FIG. 4, there is shown the integral ferrite structure 26 prepared from the first and second ferrite blocks 10, 12 which have been bonded together as described above. The integral ferrite structure 26 has a magnetic gap 30 having a desired gap distance defined by the gap-forming portions 18 of the two ferrite blocks 10, 12. It is noted that the glass material 28 in the molten state flows through the magnetic gap 30 when the blocks 10, 12 are heated, and the solidified glass material fills the magnetic gap 30 in the integral ferrite block 26, whereby the magnetic gap 30 is protected by the glass filler 28.

The desired gap distance of the magnetic gap 30 is usually given by grinding or etching at least one of the gap-forming portions 18 of the first and second ferrite blocks 10, 12, by a suitable amount, before or after the coil-winding grooves 24 are formed. When the magnetic gap 30 is formed by forming a non-magnetic layer of a non-magnetic material such as a glass on at least one of the gap-forming portions 18, the amount of the magnetic gap 30 is determined by the thickness of the non-magnetic layer or layers. For instance, a non-magnetic material such as $SiO_2$ or glass is applied by sputtering or other suitable method to at least the gap-forming portion or portions 18 of the ferrite block or blocks 10, 12, so as to form a non-magnetic gap-forming layer having a suitable thickness. With the first and second ferrite blocks bonded together, the magnetic gap 30 having a gap distance corresponding to the thickness of the non-magnetic layer is formed between the two blocks.

The integral ferrite structure 26 consisting of the bonded two ferrite blocks 10, 12 is then cut into two halves, along a cutting line indicated at 34 in dashed line in FIG. 4. Thus, two ferrite bars 32 one of which is shown in FIG. 5 are prepared. Each of the ferrite bars 32 has a sliding surface 36 in which the magnetic gap 30 is exposed or open. In operation of the core sliders prepared from this ferrite bar 32, a magnetic disk rotates in sliding contact with the sliding surface 36.

If necessary, the sliding surface 36 of the thus formed ferrite bar 32 is subjected to a grinding operation. The amount of stock removal by the grinding operation may be such that the grinding operation is terminated when the desired depth of the magnetic gap 30 is obtained. However, the finish grinding of the sliding surface 36 to establish the final depth of the magnetic gap 30 is preferably performed after a laser-induced etching operation and before a chemical etching operation (both of which will be described in detail), because the laser-induced etching operation produces chips of the ferrite material, which adhere to or are scattered on the laser etched surface. Namely, the final grinding operation is effective to remove these chips.

Next, the above-indicated laser-induced etching operation is performed on the ground sliding surface 36 of the ferrite 32, in order to form at least two pairs of track-defining grooves 38, as shown in FIG. 6, so that the ferrite bar 32 provides at least two track portions 40 for at least two core sliders. The two track-defining grooves 38 of each pair extend parallel to each other, across the interface between the first and second ferrite blocks 10, 12, so as to define the width of the corresponding track portion 40.

The laser-induced etching to form the track-defining grooves 38 makes it possible to form the track portions 40 for eventually producing sufficiently narrow tracks with high precision, such that the opposite side surfaces defining the width of the track portions 40 are almost normal to the sliding surface 36, that is, about 80-90° with respect to the sliding surface 36. Namely, the laser-induced etching permits the grooves 38 to be formed such that the surfaces defining the track portions are almost perpendicular to the sliding surface 36. Therefore, the grooves 38 thus formed for the track of a core slider to be produced are effective to minimize the cross talk due to the reading of information from the tracks of a magnetic disk adjacent to the relevant track of the disk while the core slider is operating with the disk being spaced apart from the track of the core slider. Further, the almost vertically formed track-defining grooves 38 prevents a change in the track width by the grinding of the sliding surface 36 so as to determine the desired depth of the magnetic gap 30. Moreover, the laser-induced etching does not cause chipping of the edge portions of the tracks which would occur where the tracks are formed by a grinding wheel. Also, the laser-induced etching to form the track-defining areas 40 does not cause nicks and burrs which would be generated where the core slider is a so-called "metal-in-gap" type, with a metallic magnetic material provided adjacent to the magnetic gap. Thus, the laser-induced etching for forming the track portions 40 for the tracks of the core sliders provides several significant advantages as described above.

As mentioned above, the laser-induced etching operation to form the track portions 40 is preceded by an operation to grind the sliding surface 36 of the ferrite bar 32. If the final desired depth of the magnetic gap 30 is not obtained by this grinding step, a finish grinding step to establish the final gap depth is effected after the track-defining grooves 38 are formed in the preliminarily ground sliding surface 36. In this case, the scattered particles produced during the laser-induced etching can be advantageously removed when the sliding surface 36 is finally ground to establish the final depth of the magnetic gap 30.

Figures 8A, 8B:
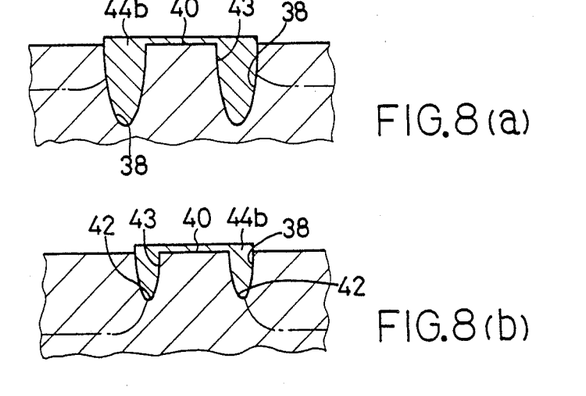
FIGS. 8(a) and 8(b) are fragmentary elevational views in cross section of the ferrite bar, taken along line VIII—VIII of FIG. 7, showing an etching mask filling the track-defining grooves, and the chemically etched ferrite bar, FIGS. 8(a) and 8(b) indicating different depths of the grooves.

Preferably, the laser-induced etching to form the track-defining grooves 38 employs an argon laser radiation having a wavelength of not exceeding 1 $\mu$m, and is conducted with the ferrite bar 32 placed within a suitable atmosphere such as $CCl_4$ (carbon tetrachloride) gas atmosphere of a pressure of 50-150 Torr. Each pair of grooves 38, 38 defining each track portion 40 preferably have a depth reaching the coil-winding grooves 24, desirably at least 3 $\mu$m. The length of each of the grooves 38, 38, which is twice a distance l (FIG. 10) between the magnetic gap 30 and each end of the groove 38, is determined to be at least equal to the maximum wavelength of an information recording light beam, generally at least 10 $\mu$m, and preferably, at least 20 $\mu$m. If the final depth of the track-defining grooves 38, 38 is smaller than 3 μm, fillets 42 which may be produced as indicated in FIG. 8(b) in a subsequent chemical etching step may undesirably serve to read information from a magnetic disk. If the distance l from the magnetic gap 30 is shorter than that specified above, portions of the eventually formed track as indicated at "a" in FIG. 10 tends to read information from the tracks of a magnetic disk adjacent to the relevant track of the disk. In FIGS. 8(a) and 8(b), one-dot chain lines indicate the surfaces of the ferrite bar 32 after the surface 36 is subjected the subsequent chemical etching.

Usually, the laser-induced etching for the track-defining grooves 38 is performed with laser power of 30–300 mW, a scanning speed of 2–60 μm/sec, and a maximum laser beam diameter of 10 μm. Because the accuracy of the final track width must be held within ±2 μm, the scanning speed, laser beam diameter and laser power should not exceed the upper limits specified above. Further, the upper limits of the scanning speed and the laser beam diameter should not be exceeded, in order to prevent curving of the opposite side surfaces 43 of the track portions 40 (surfaces of the grooves 38 defining the width of the areas 40), namely, in order to maintain the angle of the side surfaces 43 of the areas 40 within a range of 80–90° with respect to the top surface of the areas 40, as indicated in FIGS. 8(a) and 8(b). Further, it is important to avoid an excessively low laser power and an excessively high scanning speed, in order to form the track-defining grooves 38 to a depth not smaller than 3 μm.

If the disk sliding surface 36 has already been ground to the final gap depth prior to the laser-induced etching operation, the laser-induced etching operation is usually performed under the following conditions: laser power of 30–200 mW; scanning speed of 2–30 μm/sec; and laser beam diameter of 5 μm or less. These conditions may avoid undesirable results such as scattered ferrite chips or particles adhering to the ground surface 36, rounding of the edges of the track portions 40 exceeding 2 μm, and formation of a denatured or degenerated ferrite layer.

If the final grinding step to establish the final gap depth follows the laser-induced etching of the grooves 38, the laser-induced etching is usually performed under the following conditions: laser power of 50–300 mW; laser scanning speed of 2–60 μm/sec; and laser beam diameter of 10 μm or less. These conditions assure the depth of the grooves 38, 38 not smaller than 3 μm+(final grinding depth), and the almost vertical side surfaces 43 of the track portions 40, which allows a constant width of the tracks (track portions 40) irrespective of the amount of stock removal by the grinding of the sliding surface 36. The laser-induced etching which precedes the final grinding step as indicated above may be effected with the ferrite bar 32 placed in an etching liquid or solution (such as an aqueous solution of phosphoric acid or potassium hydroxide). For instance, the track-defining grooves 38 can be suitably formed by a laser-induced etching process as disclosed in Japanese patent application No. 63-47540 filed in the name of the present assignee, wherein the laser-induced etching is carried out in a solution of phosphoric acid having a concentration of 10–90 wt %, with a maximum laser beam diameter of 50 μm, laser power P of 50–1,900 mW, and a scanning speed V of 2–200 μm/sec, where $V \leq 0.31P + 34$, and $V \leq -0.14P + 271$. The laser power P and the scanning speed V are determined so as to satisfy the above two formulas.

Thereafter, the ferrite bar 32 having the track portions 40 formed on the disk sliding surface 36 by the track-defining grooves 38, 38 is subjected to a process of forming a pair of parallel spaced-apart air bearing portions and a track protrusion (including the track portion 40) for each core slider prepared from the ferrite bar 32. Namely, the suitably ground sliding surface 36 in which the track portions 40 are formed is chemically etched so that each section of the ferrite bar 32 corresponding to each core slider is provided with two spaced-apart raised air bearing portions (indicated at 46 in FIG. 9), and a raised track protrusion (indicated at 48 in FIG. 9) which has the same height as the air bearing portion 46.

Figure 7:
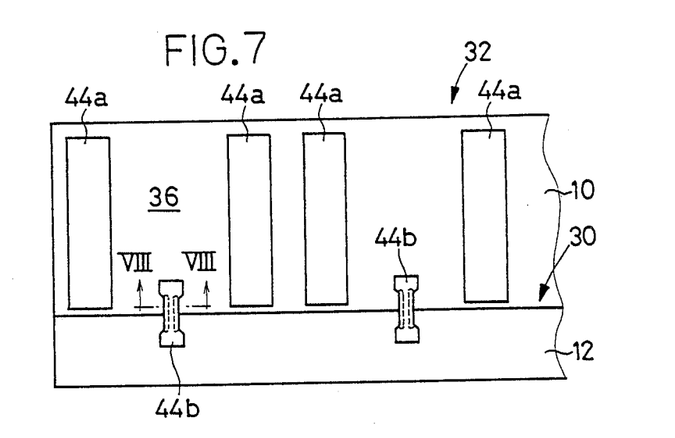
FIG. 7 is a fragmentary plan view of the ferrite bar to which etching masks are applied for forming air bearing portions and track protrusions.

Described more specifically, the air bearing portions 46 and the track protrusion 48 on the disk sliding surface 36 of the ferrite bar 32 are formed by first applying a pattern of first etching masks 44a corresponding to the air bearing portions 46, and a pattern of second etching masks 44b corresponding to the track protrusions 48, as shown in FIG. 7. Then, a chemical etching of the surface 36 of the ferrite bar 32 is effected to a predetermined etching depth, through the applied patterns of etching masks 44a, 44b, whereby the air bearing portions 46 and the track protrusion 48 are formed with the height corresponding to the etching depth, as described below.

In order to maintain the straightness or linearity of the longitudinal edges of the air bearing portions 46 to within ±15 μm, the ground disk sliding surface 36 of the ferrite bar 32 is preferably mirror-polished, and is subjected to a suitably heat treatment or chemical etching treatment, before the etching masks 44a, 44b are applied. This preliminary processing step is disclosed in laid-open Publication Nos. 62-83483, 64-15380 of unexamined Japanese patent applications filed in the name of the present assignee, and in Japanese patent application No. 63-75744 also filed in the name of the present assignee. The preliminary heat or chemical etching treatment is desirable for removing the residual strain of the surface 36 to which the masks 44a, 44b are applied, the strain being caused by the prior working on the ferrite blocks 10, 12.

The heat treatment is effected at a temperature of at least 200° C., usually at 200–1300° C., in an atmosphere of an oxygen concentration equal to or less than an equilibrium oxygen concentration of ferrite. The chemical etching can be effected by using an aqueous solution of acid such as phosphoric acid and hydrochloric acid. Preferably, the chemical etching is effected by immersing the ferrite bar 32 in an aqueous solution consisting of at least 20% by weight of water and the balance being principally phosphoric acid, as disclosed in the above-identified laid-open Publication No. 62-83483. The use of this etching solution is desirable for maintaining the mirror finish of the etched surface, and for easy etching operation. If the preliminary heat treatment and chemical etching are both practiced, the residual strain of the ferrite bar 32 can be removed more effectively.

The etching masks 44a, 44b are formed by a suitable known method such as screen-printing technique, which is selected from the standpoint of required patterning precision and economy. For relatively high patterning accuracy and ease, a photolithographic method using a photoresist is preferably practiced. For example, the entire surface of the ground sliding surface 36 of the ferrite bar 32 is coated with a photoresist layer, and this photoresist layer is exposed to a radiation through a photomask corresponding to the mask patterns 44a, 44b, so that the areas of the sliding surface 36 other than those corresponding to the air bearing portions 46 and the track protrusions 48 (including the track portions 40 defined by the track-defining grooves 38) are exposed. It is noted that the grooves 38 are filled with the masks 44b. The photoresist for the etching masks 44a, 44b may be a positive type or a negative type. Further, the masks 44a, 44b may be formed of other materials such as Cr or other metals or SiO or SiO$_2$, by vacuum vapor deposition, sputtering, CVD (chemical vapor deposition) or other suitable technique. The material and the forming method of the masks 44a, 44b are selected depending upon the specific requirements in terms of ease and economy of formation, and adhesion to the ferrite surface 36.

The ferrite bar 32 provided with the desired masks 44a, 44b is subjected to an chemical etching operation through the mask patterns 44a, 44b, whereby the areas of the surface 36 not covered by the masks are chemical etched to a predetermined depth. As a result, the air bearing portions 46 corresponding to the masks 44a and the track protrusions 48 corresponding to the masks 44b are formed as raised portions having a height equal to the etching depth, as shown in the plan view of FIG. 9 and the enlarged fragmentary view of FIG. 10. Around the air bearing portions 46 and the track protrusions 48, there are formed inclined portions or surfaces 50. The side surfaces 43 of the track-defining grooves 38 defining the width of the track portions 40 are prevented from being etched by the masks 44b left in the grooves 38. Therefore, these side surfaces 43 remain as formed by the laser-induced etching, i.e., remain almost perpendicular to the top surface of the track portions 40, as shown in FIG. 8.

The chemical etching using the masks 44a, 44b is conducted in a usual manner, preferably in an aqueous solution of an acid consisting principally of phosphoric acid. The concentration of the phosphoric acid desirably ranges from 50 to 85% by weight. With the phosphoric acid concentration lower than 50 wt. %, the required etching time is relatively long, and the etching efficiency tends to be low. With the phosphoric acid concentration exceeding 85 wt. %, the etching depth tends to fluctuate, and the accuracy of the width dimensions of the air bearing portions 46, track protrusions 48 and track portion 40 tends to be deteriorated. The phosphoric acid solution is preferably maintained at a temperature of 50–90° C. If the temperature of the solution exceeds 90° C., the water content in the aqueous solution considerably changes, and the temperature distribution of the aqueous solution becomes uneven, causing a variation in the etching depth and deterioration of the width accuracy of the formed air bearing portions 46 and track protrusions 48. If the temperature of the solution is lower than 50° C., the required etching time increases, and the etching efficiency is lowered.

In this way, the track portion 40 is finished, and the air bearing portions 46 and the track protrusions 48 are concurrently produced by the chemical etching, together with the inclined surfaces 50 along the peripheries of the portions 46 and protrusions 48. The chemical etching thus eliminates a conventionally practiced machining operation such as multiple grinding passes with a grinding wheel. The combination of the laser-induced etching of the track-defining grooves 38 and the chemical etching using the masks 44a, 44b permit the air bearing portions 46 and the track protrusions 48 (including the track portions 40) to be accurately formed in a considerably reduced time, without the conventionally encountered chipping. When the core slider prepared from the thus processed ferrite bar 32 is operated in sliding contact with a magnetic disk, the track portion 40 is protected from excessive wear, by the two air bearing portions 46 which has the same height as the track portion 40 and which are located on both sides of the extension line of the track portion 40. Further, the two extensions extending from the opposite longitudinal ends of the track portion 40 of the track protrusion 48 reinforce the track portion 40, even when the side surfaces 43 of the track portion 40 are formed substantially perpendicular (about 90°) to its top surface.

Figure 11:
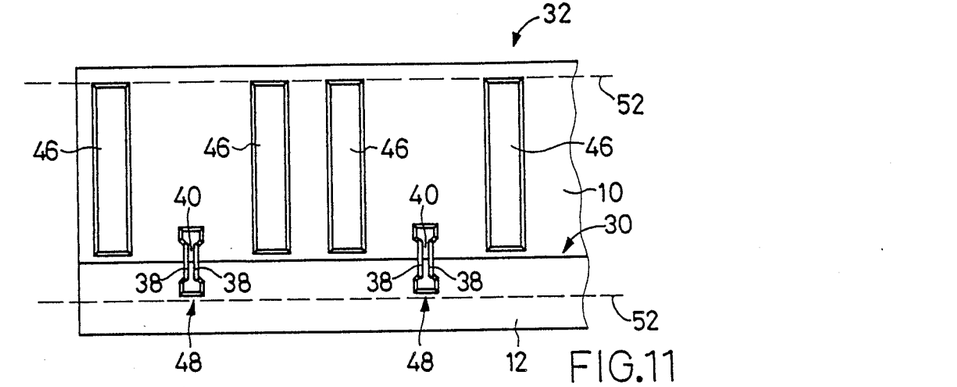
FIG. 11 is a fragmentary plan view showing cutting lines of the ferrite bar.

Then, the ferrite bar 32 is cut as needed, at a desired position or positions in the direction of width of the bar, for example, along two parallel cutting lines as indicated by dashed lines 52, 52 in FIG. 11, so that the core sliders prepared from the ferrite bar 32 have a predetermined length (in the direction of extension of the air bearing portions 46). Subsequently, the air bearing portions 46 are tapered at their leading end portions, as indicated at 54 in FIG. 12, so that the tapered end portions provide leading ramps 54 having a suitable length and an angle of inclination.

Figure 12:
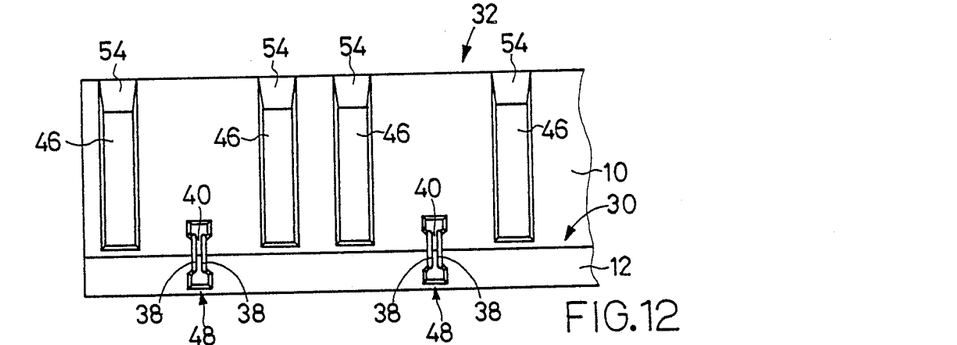
FIG. 12 is a fragmentary plan view showing the ferrite bar which has been cut along the cutting lines of FIG. 11 and which has been subjected to a tapering operation.
Figure 13:
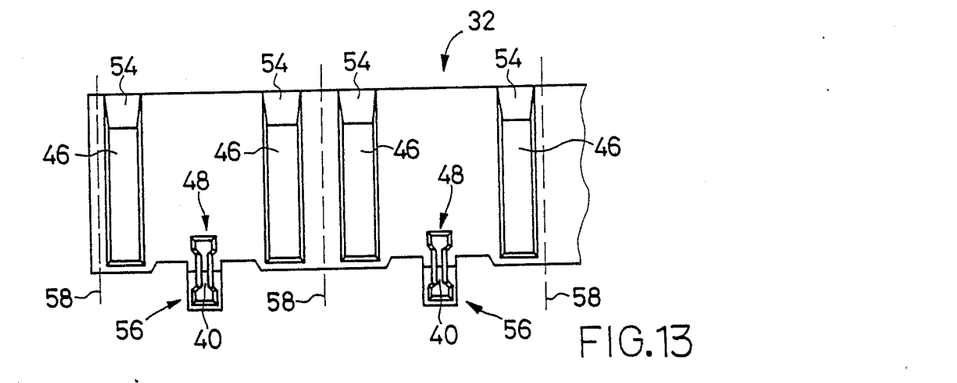
FIG. 13 is a fragmentary plan view of the ferrite bar, showing yoke portions formed by cutting the ferrite bar, and the cutting lines along which the bar is cut to produce two head core sliders.

In the next step, the ferrite bar 32 as shown in FIG. 12 is subjected to a cutting operation to remove a lower end portion (as shown in the lower side of FIG. 12) except the areas corresponding to the track protrusions 48, so as to provide yoke portions 56 at one of opposite ends of the ferrite bar 32 remote from the leading ramps 54 in the direction of width of the bar. Each yoke portion 56 includes the corresponding track protrusion 48, which in turn has the track portion 40 whose width is defined by the track-defining grooves 38. The ferrite bar 32 thus provided with the yoke portions 56 is then cut along parallel cutting lines 58 parallel to the direction of width of the bar, as indicated in FIG. 13, so that each cut segment includes the two air bearing portions 46 and the one track protrusion 48. Thus, a plurality of head core sliders for a rigid magnetic disk drive, one of which is shown at 60 in FIG. 14, are obtained by cutting the ferrite bar 32 of FIG. 13.

Figure 14:
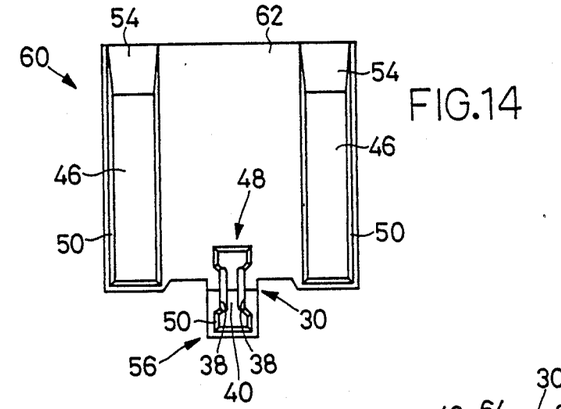
FIG. 14 is a plan view showing one of the core sliders obtained from the ferrite bar of FIG. 13.

It will be understood from FIG. 14 that the head core slider 60 prepared according to the present embodiment of the invention has a slider body 62 having the two spaced-apart parallel air bearing portions 46, and the yoke portion 56 which is integral with the slider body 62. The yoke portion 56 has the magnetic gap 30 open in the top surface of the track portion 40 of the track protrusion 48. The slider body 62 and the yoke portion 56 cooperate with each other to constitute a magnetic head having a C-shaped magnetic path which is partly defined by the track portion 40 in which the magnetic gap 30 with a suitable gap distance is open.

In the illustrated embodiment, the track-forming grooves 38 are filled with the material of the masks 44b as indicated in FIGS. 8(a) and 8(b), for protecting the side surfaces 43 of the track portion 40 (surfaces of the grooves 38 defining the width of the track portion 40) from the chemical etching for forming the air bearing portions 46 and the track protrusions 48. However, the side surfaces 43 may be protected by a glass material or other suitable non-magnetic material which fills the grooves 38. In this case, the grooves 38 are filled with the non-magnetic material after the grooves 38 are formed by a laser-induced etching operation. Then, the disk sliding surface 36 of the bar 32 is ground so as to establish the final depth of the magnetic gap 30, and the masked ferrite bar 32 is chemically etched to form the air bearing portions 46 and the track protrusions 48.

Figure 15:
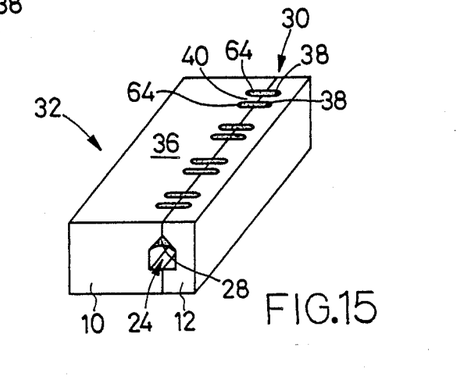
FIG. 15 is a perspective view of a ferrite bar with a non-magnetic material embedded in the track-defining grooves.

For example, the track-defining grooves 38 formed in the ferrite bar 32 as shown in FIG. 6 is filled with a suitable non-magnetic material 64 such as a glass, in a suitable manner, as shown in FIG. 15. Then, the disk sliding surface 36 is ground to obtain the final gap depth, while at the same time removing an unnecessary excess mass of the non-magnetic material 64.

Figure 16:
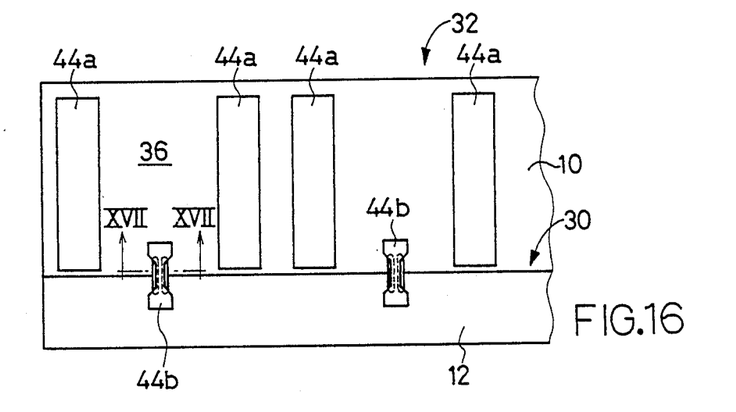
FIG. 16 is a fragmentary plan view of the ferrite bar to which etching masks are applied.
Figure 17:
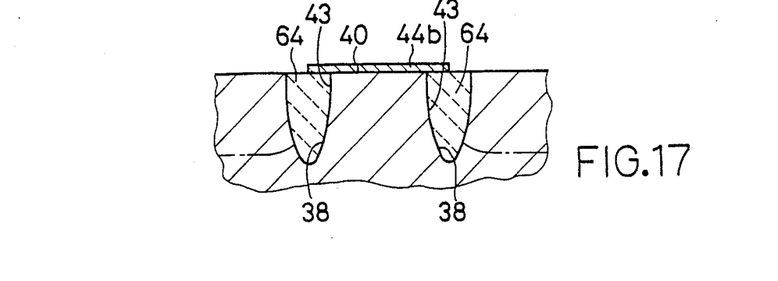
FIG. 17 is a fragmentary cross sectional view taken along the line XVII—XVII of FIG. 16, showing the non-magnetic material embedded in the track-defining grooves, after the ferrite bar is etched via the etching mask.

Subsequently, the ferrite bar 32 with the grooves 38 filled with the non-magnetic material 64 is subjected to process steps for forming the air bearing portions 46 and the track protrusions 48, as previously described. More particularly, the etching masks 44a, 44b are applied to the ground sliding surface 36, as shown in FIG. 16, and the ferrite bar 32 is chemically etched through the masks 44a, 44b, in the same manner as described above with respect to the preceding embodiment. As a result, the portions of the surface 36 not covered by the masks 44a, 44b are etched to a depth indicated by one-dot chain line in FIG. 17, whereby the air bearing portions 46 and the track portions 48 are formed. Since the chemical etching is effected with the track-defining grooves 38 filled with the non-magnetic material 64, the side surfaces 43 of the track portions 40 are suitably prevented from being chemically etched, as is apparent from FIG. 17.

Figure 18:
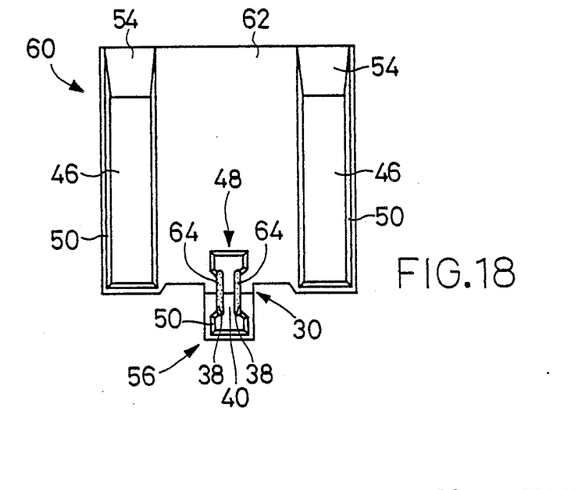
FIG. 18 is a plan view of a core slider obtained from the ferrite bar.

In the same manner as described above, a head core slider 60 for a rigid magnetic disk drive similar to that of FIG. 14 is eventually prepared as shown in FIG. 18. In the present embodiment, the non-magnetic material 64 filling the grooves 38 effectively also serves to protect the edges of the track portion 40 against chipping.

Figure 19:
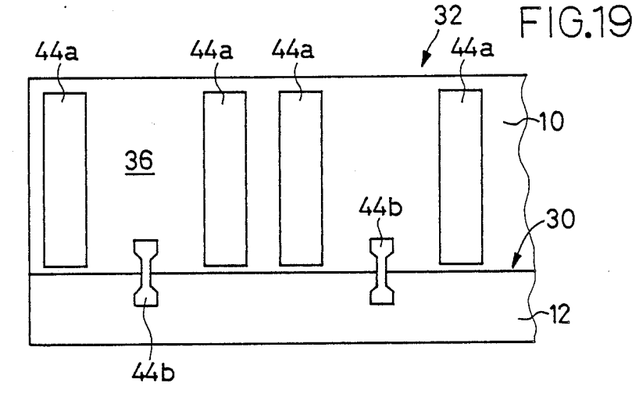
FIGS. 19 and 20 are views illustrating respective steps of a further embodiment of the present invention, FIG. 19 being a fragmentary plan view of the ferrite bar with no track-defining grooves and etching masks applied thereto, and FIG. 20 being a fragmentary plan view of the ferrite bar etched to form the air bearing portions and track protrusions.
Figure 20:
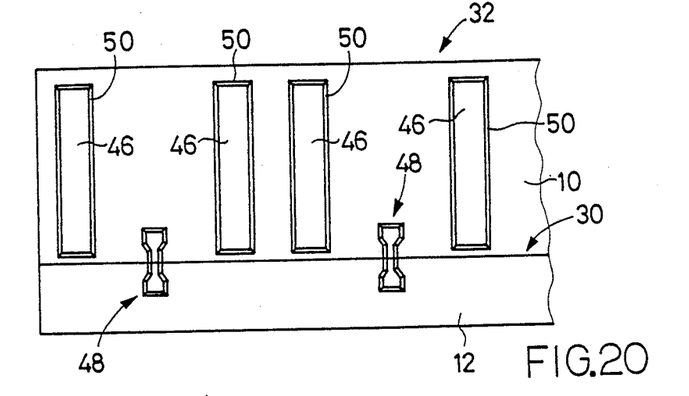

Referring to FIGS. 19 and 20, a further modified embodiment of the present invention will be described.

Contrary to the preceding embodiments, this embodiment is adapted such that the laser-induced etching step of forming the track-defining grooves 38 for defining the width of the track portions 40 is carried out after the chemical etching step of forming the air bearing portions 46 and the track protrusions 48.

Namely, the ferrite bar 32 consisting of the first and second ferrite blocks 10, 12 at least one of which has at least one coil-winding groove is first subjected to a chemical etching operation to form the air bearing portions 46 and the track protrusions 48. For instance, the ferrite bar 32 with the magnetic gap 30 open in the sliding surface 36 as shown in FIG. 5 is provided with the etching patterns 34a, 44b as indicated in FIG. 19. The non-masked areas of the sliding surface 36 are chemically etched to a predetermined depth, whereby the ferrite bar 32 is provided with the air bearing portions 46 and the track protrusions 48, as shown in FIG. 20.

Figure 9:
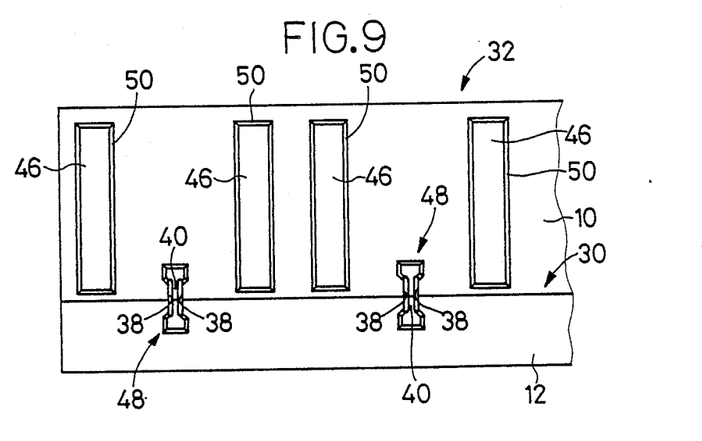
FIG. 9 is a fragmentary plan view of the ferrite bar showing the air bearing portions and the track portions formed by the etching operation.
Figure 10:
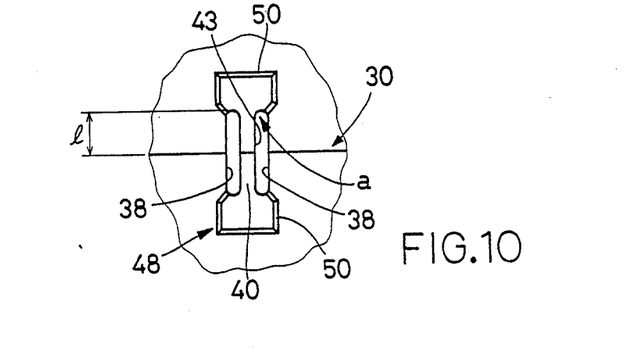
FIG. 10 is an enlarged fragmentary view illustrating a portion of the ferrite bar of FIG. 9.

Thereafter, the laser-induced etching operation is effected for forming the track-defining grooves 38 in the formed track protrusions 48, so as to extend across the interface of the first and second ferrite blocks 10, 12, so as to define the width of the track portions 40 as indicated in FIGS. 9 and 10.

In the case where the laser-induced etching following the chemical etching is not followed by a final grinding step, the laser-induced etching in $CCl_4$ gas atmosphere of a pressure of 50-150 Torr. is preferably effected under the following conditions: laser power of 30-200 mW; scanning speed of 2-30 $\mu$m/sec; and maximum laser beam diameter of 5 $\mu$m. If the final grinding step follows the laser-induced etching step, the following conditions are preferably used: laser power of 50-300 mW; scanning speed of 2-60 $\mu$m/sec; and maximum laser beam diameter of 10 $\mu$m.

After the track-defining grooves 38 are formed, the sliding surface 36 of the ferrite bar 32 is ground as needed, and core sliders similar to the core slider 60 of FIG. 14 are obtained by cutting the ferrite bar 32, in the same manner as described above.

The present method described above by reference to FIGS. 19 and 20 provides the same advantages as offered by the preceding methods. That is, the laser-induced etching to form the track-defining grooves 38 permits the track portions 40 to be accurately formed with a sufficiently small width such that the side surfaces 43 defining the width of the track portion 40 are almost normal (about 80-90°) with respect to the top surface. Hence, the cross talk of the core slider can be minimized, and the width of the track portion 40 does not change with the amount of stock removal of the sliding surface 36 by grinding. Further, the laser-induced etching eliminates chipping of the track portion 40, or nicks and burrs of the metallic magnetic material of the so-called metal-in-gap head core, which would be experienced when the track portion is formed by a grinding wheel. Furthermore, the chemical etching to simultaneously form the air bearing portions 46 and the track protrusions 48 considerably reduces the required time for production of the core sliders, as compared with the conventional machining method wherein the air bearing and track portions are formed by multiple passes of a grinding wheel. The chemical etching does not cause chipping at the edges of the air bearing and track portions 46, 48. In addition, when the core slider is operated in sliding contact with a magnetic disk, the track portion 40 is protected from excessive wear, by the two air bearing portions 46 which has the same height as the track portion 40 and which are located on both sides of the extension line of the track portion 40. Further, the two extensions extending from the opposite longitudinal ends of the track portion 40 of the track protrusion 48 reinforce the track portion 40, even when the side surfaces 43 of the track portion 40 are formed substantially perpendicular (about 90°) to its top surface.

While several different embodiments of the method of the present invention for producing a core slider for a rigid magnetic disk drive have been described above, these embodiments may be adapted such that a metallic magnetic layer having a suitable thickness may be formed on at least one of the abutting surfaces of the first and second ferrite blocks, so as to cover at least a gap-forming portion of the relevant abutting surface, before the two ferrite blocks are butted and bonded together. In this case, a non-magnetic layer having a suitable thickness is further formed on at least one of the abutting surfaces of the blocks (which may or may not be provided with the metallic magnetic layer indicated above), so that at least the gap-forming portion of the abutting surface is covered by the non-magnetic layer.

Figure 21:
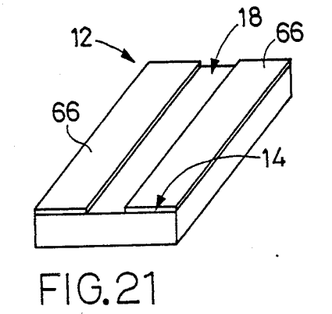
FIGS. 21 and 22 are perspective views respectively showing etching masks applied to a ferrite block, and the ferrite block etched through the masks.
Figure 22:
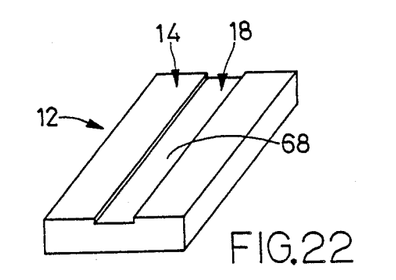
Figure 23:
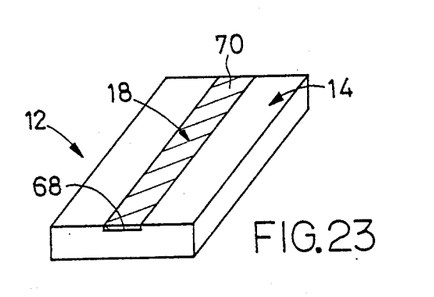
FIG. 23 is a perspective view showing the etched ferrite block coated with a metallic magnetic material.

To form the metallic magnetic layer only in the gap-forming portion of the abutting surface of one of the two ferrite blocks, for example, the portions of the abutting surface other than the gap-forming portion are covered by etching masks similar to the masks 44a, 44b used in the preceding embodiments. The relevant ferrite block is then chemically etched through the masks, whereby the non-masked gap-forming portion is etched to a suitable depth. The etched gap-forming portion is filled with the metallic magnetic layer. An example of these process steps is illustrated in FIGS. 21-23. In this example, the metallic magnetic layer is provided on the second ferrite block 12 which gives the yoke portion of each core slider to be produced. Initially, etching masks 66 are applied to the abutting surface 14, such that the gap-forming portion 18 is exposed or uncovered. The gap-forming portion 18 of the second ferrite block 12 is an elongate area which is located in a transversely central portion of the abutting surface 14 and which extends in the longitudinal direction of the block 12. As in the preceding embodiments, the second block 12 cooperates with the first ferrite block 10 (not shown in FIGS. 21-23) to provide an integral ferrite structure from which two ferrite bars are obtained. To this end, the gap-forming portion 18 of the second block 12 is located centrally of the block in the width direction.

The second ferrite block 12 with the masks 66 applied thereto as shown in FIG. 21 is chemically etched, whereby an elongate etched recess 68 is formed in the central non-covered gap-forming portion 18 as shown in FIG. 22. The depth of the recess 68 is equal to the etching depth.

The abutting surface 14 of the second ferrite block 12 having the etched recess 68 thus formed in the gap-forming portion 18 is covered by a suitable metallic magnetic material. The metallic magnetic material 70 may be a known crystalline alloy or a known non-crystalline alloy. Typical examples of the crystalline alloy include Fe-Si alloys (containing 6.5% by weight of Si), Fe-Al-Si alloys (commercially known as "Sendust"), and Ni-Fe alloys (commercially known as "Permalloy"). Examples of the non-crystalline alloy are metal-metalloid alloys such as Fe-Co-Si-B, and metal-metal alloys such as Co-Zr and Co-Zr-Nb. The Fe-Si or Fe-Si-Al alloys may preferably contain up to 5% by weight of additives such as Cr, Ti and Ta for improving the corrosion resistance of the magnetic material 70. The selected metallic magnetic material 70 is applied to the etched recess 68 by a suitable known method, such as sputtering, vacuum vapor deposition, ion-plating, CVD and plating. However, the sputtering is most preferred for reduced composition displacement of the applied material and reduced limitation in the choice of the material.

As an intermediate layer between the ferrite of the block 12 and the layer of the metallic magnetic material, a glass layer having a thickness of several tens of angstroms to 100 angstroms may be applied to the abutting surface surface 14 having the etched recess 68, before the metallic magnetic material is applied to cover the surface 14. This intermediate layer improves the adhesion of the metallic magnetic layer 70 to the ferrite block 12. Since the thickness of the intermediate glass layer is small enough (100 angstroms or less), the function of the intermediate layer as a magnetic gap is negligibly small and does not practically cause a problem due to its function as the gap. Further, the inclusion of at least one of Fe, Ni, Co and similar elements in the intermediate layer is advantageous, because it provides a further improvement of the adhesion of the magnetic layer. It is also noted that the metallic magnetic layer does not practically cause a problem due to its function as a gap, provided that the thickness of the magnetic layer does not exceed 1000 angstroms.

Then, the abutting surface 14 of the second ferrite block 12 which has been covered by the metallic magnetic material is machined and/or ground in a usual manner, so as to remove unnecessary stock of the magnetic material 70, together with a given thickness of the superficial ferrite material, so that the metallic magnetic material is left only in the etched recess 68, as a metallic magnetic layer 70 having a suitable thickness, while the portions of the abutting surface 14 other than the gap-forming portion 18 are exposed, as indicated in FIG. 23.

Figures 24, 25:
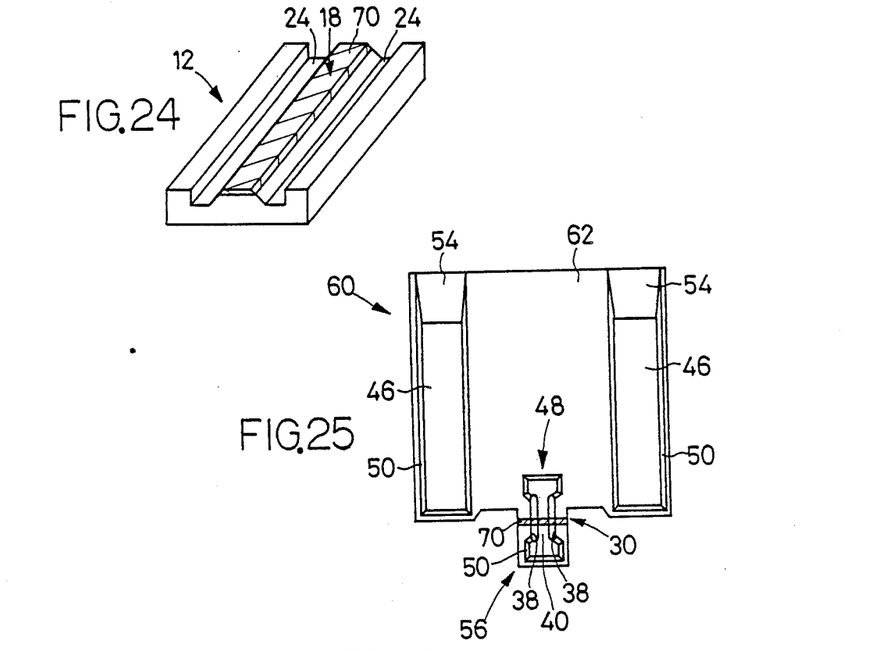
FIG. 24 is a perspective view of the ferrite block of FIG. 23 in which coil-winding grooves are formed.
FIG. 25 is a plan view of a core slider obtained from the ferrite block of FIG. 24.

Subsequently, at least one coil-winding groove is formed in the abutting surface 14 of at least one of the first and second ferrite blocks. In this example, two coil-winding grooves 24 are formed in the second ferrite block 12, as shown in FIG. 24. Similarly, two coil-winding grooves 24 are formed in the first ferrite block 10, as indicated in FIG. 3(b). Since two ferrite bars are prepared from an integral ferrite structure consisting of the first and second ferrite blocks 10, 12, each of these blocks is provided with the two coil-winding grooves 24 on both sides of the gap-forming portion 18. Before the blocks 10, 12 are butted and bonded together into to the integral ferrite structure, the abutting surfaces 14 are finished by grinding as needed.

In the next step, a suitable non-magnetic material such as $SiO_2$ or glass is applied to at least the gap-forming portion 18 (metallic magnetic layer 70) of at least one of the two blocks 10, 12, by sputtering or other suitable method. Thus, the non-magnetic layer having a suitable thickness is formed on at least one of the abutting surfaces of the two blocks 10, 12.

The integral ferrite structure prepared by bonding the first and second ferrite blocks 10, 12 is cut to provide two ferrite bars. Each of these ferrite bars is then subjected to a laser-induced etching step to form track-defining grooves 38, and a chemical etching step to form air bearing portions 46 and track protrusions 48, as described above with respect to the preceding embodiments. The ferrite bar is then cut to provide core sliders for a rigid magnetic disk drive, one of which is indicated generally at 60 in FIG. 25. These core sliders are composite type sliders having a so-called metal-in-gap head wherein the magnetic gap 30 is defined by the metallic magnetic layer 70 having a high saturated magnetic flux density.

According to the present method of the invention described above by reference to FIGS. 21-25, the laser-induced etching to form the track-defining grooves 38 may be effected after the chemical etching to form the air bearing portions 46 and track protrusions 48. However, the chemical etching step is preferably effected after the track-defining grooves 38 are formed by the laser-induced etching. In the latter case in which the chemical etching follows the laser-induced etching, the track-defining grooves 38 are protected from the chemical etching, by the etching masks for forming the track protrusions 48 which include the track portions 40 whose width is defined by the pair of grooves 38. Namely, the surfaces which define the width of the track portions 40 may be kept almost perpendicular to the top surface of the tracks. It is also possible and desirable to fill the track-defining grooves 38 with a suitable non-magnetic material such as a glass, and then grind the sliding surface of the ferrite bar so as to determine the final depth of the magnetic gap 30, before the chemical etching.

The laser-induced etching is preferably effected in an atmosphere of $CCl_4$ (carbon tetrachloride) gas. It may be effected also in an aqueous solution of KOH of a concentration of 5-55 wt %, as proposed in Japanese patent application No. 63-53678 filed in the name of the present assignee. In this case, the laser-induced etching is preferably conducted under the following conditions: maximum laser beam diameter of 20 $\mu$m; laser power P of 50–1,000 mW; and scanning speed V of 2–130 $\mu$m/sec., wherein $V \leq 0.34P + 13$ and $V \leq -0.19P + 190$. The laser power P and scanning speed V are determined so as to satisfy both of the above formulas. An aqueous solution of phosphoric acid having a concentration of 50–90 wt. % may also be used as a preferred etching solution, as disclosed in Japanese patent application No. 63-47540. In this case, the laser-induced etching is conducted under the following conditions: maximum laser beam diameter of 10 $\mu$m; laser power P of 50–1900 mW; and scanning speed V of 2–200 $\mu$m/sec., wherein $V \leq 0.31P + 34$, and $V \leq -0.14P + 271$.

The present method of producing a core slider for a magnetic disk drive provides the same advantages as described above with respect to the preceding embodiments. Further, the metallic magnetic layer 70 applied adjacent to the sliding surface of the track portion 40 serves to reduce an eddy current loss of the head, thereby effectively enhancing the operating characteristics of the head. Moreover, the almost perpendicular relation of the opposite side surfaces and the top surface of the track portion 40 significantly effectively minimizes the cross talk of the head, and enables the core slider to be used for a recording medium which has a comparatively high magnetic coercive force, i.e., which permits high-density storage of information.

The order of the steps of applying the metallic magnetic material and the gap-forming non-magnetic material and the step of forming the coil-winding grooves is not limited to that described above, but these steps may be implemented in any order, provided that the steps are completed before the first and second ferrite blocks are bonded together.

While the method of producing a core slider for a rigid magnetic disk drive according to the principle of the present invention has been described in its presently preferred embodiments, it is to be understood that the invention is not limited to the details of the illustrated embodiments, but may be embodied in the other forms, with various changes, modifications and improvements which may occur to those skilled in the art, without departing from the spirit of the invention.

For example, auxiliary track-defining grooves may be formed alongside the track-forming grooves 38, by laser-induced etching or other method, so that the track portion 40 is defined by wider track-forming recesses which consist of the auxiliary grooves and the track-forming grooves 38.

Figure 26:
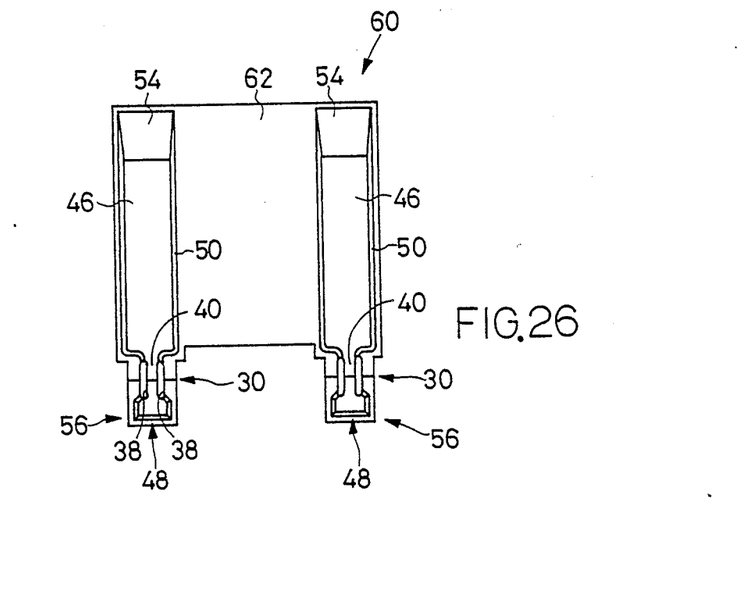
FIG. 26 is a plan view of a core slider produced according to a yet further embodiment of the invention.

In the illustrated embodiments, the yoke portion 56 is formed as an integral part of the slider body 62, between the left and right air bearing portions 46, 46. However, the yoke portion 56 may be formed in alignment with the centerline of each air bearing portion 46, as indicated in FIG. 26. In this type of core slider, the track protrusion 48 including the track portion 40 extends from the end of the corresponding air bearing portion 46, such that the track portion 40 has the same height as the air bearing portion 46. This core slider permits information recording and reading on and from a radially outer peripheral portion of a magnetic disk, since the track portion 40 is aligned with the air bearing portion 46.

What is claimed is:

1. A method of producing a head core slider for a rigid magnetic disk drive, including a slider body and a yoke portion formed as an integral part of the slider body, said slider body having a pair of spaced-apart parallel air bearing portions having a predetermined height, while said yoke portion having a track portion for sliding contact with a magnetic recording medium, the yoke portion and the slider body cooperating to form a closed magnetic path having a predetermined magnetic gap which is open in a top surface of said track portion, said method comprising the steps of:

preparing a first ferrite block which gives said slider body, and a second ferrite block which gives said yoke portion;

butting and bonding together said first and second ferrite blocks into a ferrite bar having a sliding surface on which said air bearing portions and said track portion are to be formed;

forming, by laser-induced etching, at least two parallel track-defining grooves in said sliding surface of said ferrite bar, such that said at least two track-defining grooves extend across an interface between said first and second ferrite blocks, said at least two track-defining grooves defining therebetween said track portion having a predetermined width in a direction perpendicular to a direction of extension of said grooves;

applying a pattern of etching mask to said sliding surface of said ferrite bar, so as to cover portions of said sliding surface which correspond to said air bearing portions and said track portion; and chemically etching the masked sliding surface of said ferrite bar, and thereby forming said air bearing portions, and a track protrusion which includes said track portion, such that said air bearing portion and said track protrusion have a same height.

2. A method according to claim 1, wherein abutting surfaces of said first and second ferrite blocks which define said interface have respective gap-forming portions which define an amount of said magnetic gap, said method further comprising a step of applying a layer of a metallic magnetic material to at least one of said gap-forming portions of said first and second ferrite blocks, before the ferrite blocks are bonded together into said ferrite bar.

3. A method according to claim 2, further comprising a step of applying an intermediate glass layer to at least one of said gap-forming portions of said first and second ferrite blocks, before said layer of said metallic magnetic material is applied, so that said layer of the metallic magnetic material is formed on said intermediate glass layer.

4. A method according to claim 2, further comprising a step of applying an intermediate layer to at least one of said gap-forming portions of said first and second ferrite blocks, before said layer of said metallic magnetic material is applied, so that said layer of the metallic magnetic material is formed on said intermediate layer, said intermediate layer comprising at least one of Fe, Ni and Co, and having a thickness of not exceeding 1000 angstroms.

5. A method according to claim 1, wherein said step of forming said at least two track-defining grooves by laser-induced etching is effected before said steps of applying said pattern of mask to said sliding surface of said ferrite bar and chemically etching said masked sliding surface of said ferrite bar.

6. A method according to claim 1, wherein said step of forming said at least two track-defining grooves by laser-induced etching is effected after said steps of applying said pattern of mask to said sliding surface of said ferrite bar and chemically etching said masked sliding surface of said ferrite bar.

7. A method according to claim 1, wherein said laser-induced etching is effected by an argon laser beam having a wavelength of 1 $\mu$m or less.

8. A method according to claim 1, wherein said laser-induced etching is effected with said ferrite bar placed in an atmosphere of $CCl_4$ of a pressure of 50–150 Torr., with laser power of 30–300 mW and a maximum laser beam diameter of 10 $\mu$m, and at a scanning speed of 2–50 $\mu$m/sec.

9. A method according to claim 1, wherein said laser-induced etching is effected with said ferrite bar placed in an aqueous solution of phosphoric acid having a concentration of 10–90 wt %, with a maximum laser beam diameter of 50 $\mu$m, laser power P of 50–1,900 mW, and a scanning speed V of 2–200 $\mu$m/sec., where $V \leq 0.31P + 34$, and $V \leq -0.14P + 271$.

10. A method according to claim 1, wherein said laser-induced etching is effected with said ferrite bar placed in an aqueous solution of KOH having a concentration of 5–55 wt %, with a maximum laser beam diameter of 20 $\mu$m, laser power P of 50–1,000 mW, and a scanning speed V of 2–130 $\mu$m/sec., wherein $V \leq 0.34P + 13$ and $V \leq -0.19P + 190$.

11. A method according to claim 1, further comprising a step of subjecting said ferrite bar to one of a preliminary heat treatment and a preliminary chemical etching treatment, before said pattern of mask is applied to said ferrite bar.

12. A method according to claim 1, wherein said step of chemically etching the masked sliding surface of said ferrite block is effected in an aqueous solution containing 50–85% by weight of phosphoric acid.

13. A method according to claim 1, wherein said at least two track-defining grooves are filled with a portion of said etching mask, when said pattern of etching mask is applied to said sliding surface of said ferrite bar.

14. A method according to claim 1, wherein said at least two track-defining grooves are filled with a non-magnetic material before said pattern of etching mask is applied to said sliding surface of said ferrite bar.

15. A method according to claim 1, wherein said track protrusion is positioned between said pair of air bearing portions, in the direction of width of said track portion.

16. A method according to claim 1, wherein said track protrusion is provided for each of said pair of air bearing portions, such that the track protrusion is aligned with said each air bearing portion in the direction of length of said track portion.

* * * * *